United States Patent
Nair et al.

(10) Patent No.: US 11,924,159 B2
(45) Date of Patent: *Mar. 5, 2024

(54) SYSTEM AND METHOD FOR UNIFIED MULTI-CHANNEL MESSAGING WITH BLOCK-BASED DATASTORE

(71) Applicant: PAYPAL, INC., San Jose, CA (US)

(72) Inventors: Rahul Nair, Austin, TX (US); Sandhiya Banu Mailai Udayakumar, Cedar Park, TX (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/589,652

(22) Filed: Jan. 31, 2022

(65) Prior Publication Data
US 2022/0158968 A1  May 19, 2022

Related U.S. Application Data

(63) Continuation of application No. 16/591,608, filed on Oct. 2, 2019, now Pat. No. 11,297,029.

(51) Int. Cl.
*H04L 51/56* (2022.01)
*G06F 17/00* (2019.01)
(Continued)

(52) U.S. Cl.
CPC .............. *H04L 51/56* (2022.05); *G06F 17/00* (2013.01); *G06Q 20/00* (2013.01); *H04L 9/0637* (2013.01); *H04L 51/212* (2022.05); *H04L 51/216* (2022.05); *G06Q 20/02* (2013.01); *G06Q 20/223* (2013.01); *G06Q 20/38215* (2013.01); *H04L 9/50* (2022.05)

(58) Field of Classification Search
CPC ..... H04L 51/56; H04L 51/216; H04L 51/212; H04L 9/0637; H04L 9/50; G06F 17/00; G06Q 20/00; G06Q 20/02; G06Q 20/223; G06Q 20/38215
See application file for complete search history.

(56) References Cited

U.S. PATENT DOCUMENTS 6,829,478 B1 * 12/2004 Layton ................. G08B 25/004
  370/242
8,917,855 B1 * 12/2014 Narayanaswamy .... H04M 3/53
  379/265.09

(Continued)

OTHER PUBLICATIONS

International Appl. No. PCT/US2020/053230, International Search Report and Written Opinion dated Jan. 8, 2021, 11 pages.

*Primary Examiner* — Ninos Donabed
(74) *Attorney, Agent, or Firm* — Haynes and Boone, LLP

(57) ABSTRACT

Aspects of the present disclosure involve systems, methods, devices, and the like for communicating with a unified messaging center using multi-channel messaging with block-based datastore. In one embodiment, a system is introduced that can provide a unified experience and capability for messaging with one or more entities across platforms. The messaging capability includes the ability to provide user interaction using a single architecture with data store in a centralized form. In one embodiment, the data store include the use of blockchain technology wherein each interaction with the user and across platforms is recorded and stored on a crystographed block.

20 Claims, 9 Drawing Sheets

US 11,924,159 B2

Page 2

(51) Int. Cl.
*G06Q 20/00* (2012.01)
*G06Q 20/02* (2012.01)
*G06Q 20/22* (2012.01)
*G06Q 20/38* (2012.01)
*H04L 9/00* (2022.01)
*H04L 9/06* (2006.01)
*H04L 51/212* (2022.01)
*H04L 51/216* (2022.01)

(56) References Cited

U.S. PATENT DOCUMENTS

| | | | | |
|---|---|---|---|---|
| 10,135,775 B1* | 11/2018 | Givol | | G06Q 20/405 |
| 10,225,075 B1* | 3/2019 | Moritz | | H04L 63/062 |
| 10,552,601 B2* | 2/2020 | Kilpatrick | | H04L 9/3236 |
| 10,594,484 B2* | 3/2020 | Rodriguez | | H04L 9/0861 |
| 10,623,506 B2* | 4/2020 | McFadden | | H04L 67/51 |
| 10,657,225 B2* | 5/2020 | Kilpatrick | | H04L 67/51 |
| 10,664,910 B1* | 5/2020 | Koshet | | H04L 63/102 |
| 10,701,054 B2 | 6/2020 | Padmanabhan et al. | | |
| 10,754,989 B2* | 8/2020 | Baset | | G06F 11/1482 |
| 11,032,282 B2* | 6/2021 | Revanur | | H04L 63/10 |
| 11,032,362 B2* | 6/2021 | Nguyen | | H04L 67/1031 |
| 11,295,837 B2* | 4/2022 | Mangesius | | G16H 20/00 |
| 11,425,252 B1* | 8/2022 | Martin | | H04M 3/5141 |
| 11,477,144 B1* | 10/2022 | Yasnoff | | H04L 51/56 |
| 11,522,726 B1* | 12/2022 | Alwar | | H04L 67/288 |
| 11,588,620 B2* | 2/2023 | White | | H04L 9/3297 |
| 11,611,527 B1* | 3/2023 | Oliveira | | H04L 51/214 |
| 11,611,560 B2* | 3/2023 | Padmanabhan | | H04L 63/102 |
| 11,616,752 B1* | 3/2023 | Seok | | H04L 51/10 709/206 |
| 11,616,816 B2* | 3/2023 | Cage | | G06Q 10/08 726/1 |
| 11,671,393 B2* | 6/2023 | Givol | | G06Q 20/20 709/206 |
| 11,683,387 B1* | 6/2023 | Viswanathan | | H04L 67/34 717/172 |
| 2006/0212846 A1* | 9/2006 | O'Farrell | | H04L 67/01 717/116 |
| 2010/0251230 A1* | 9/2010 | O'Farrell | | G06F 16/275 717/173 |
| 2011/0004637 A1* | 1/2011 | O'Farrell | | G06F 16/25 707/809 |
| 2011/0213785 A1* | 9/2011 | Kristiansson | | G06Q 10/10 707/748 |
| 2011/0313921 A1* | 12/2011 | Dheer | | G06Q 40/02 705/42 |
| 2012/0008753 A1* | 1/2012 | Burnett | | H04L 51/56 379/90.01 |
| 2013/0097526 A1* | 4/2013 | Stovicek | | G06Q 10/107 715/752 |
| 2013/0303267 A1* | 11/2013 | Vasquez | | G06Q 50/01 715/741 |
| 2014/0282851 A1* | 9/2014 | Miller | | H04L 67/75 726/1 |
| 2015/0295879 A1* | 10/2015 | Jung | | H04L 51/52 709/204 |
| 2016/0216130 A1* | 7/2016 | Abramson | | G01C 21/3423 |
| 2016/0350747 A1* | 12/2016 | Pruthi | | G06Q 20/108 |
| 2016/0350748 A1* | 12/2016 | Pruthi | | H04L 63/061 |
| 2017/0078259 A1* | 3/2017 | Kumar | | G06Q 40/02 |
| 2017/0244934 A1* | 8/2017 | Chien | | H04N 7/183 |
| 2017/0279957 A1* | 9/2017 | Abramson et al. | | G06F 21/36 |
| 2018/0018723 A1 | 1/2018 | Nagla et al. | | |
| 2018/0053161 A1 | 2/2018 | Bordash et al. | | |
| 2018/0114169 A1* | 4/2018 | Wiig | | G06N 5/048 |
| 2018/0114261 A1 | 4/2018 | Jayachandran | | |
| 2018/0157618 A1* | 6/2018 | Ritter | | G05B 19/056 |
| 2018/0199383 A1* | 7/2018 | Au Yeung | | H04L 67/55 |
| 2018/0270317 A1* | 9/2018 | Feng | | H04L 67/55 |
| 2018/0285879 A1* | 10/2018 | Gadnis | | G06Q 20/38215 |
| 2019/0014149 A1* | 1/2019 | Cleveland | | G06N 3/045 |
| 2019/0019090 A1* | 1/2019 | Chacko | | G06Q 10/107 |
| 2019/0050854 A1 | 2/2019 | Yang et al. | | |
| 2019/0053238 A1* | 2/2019 | Zeng | | H04W 24/08 |
| 2019/0073729 A1* | 3/2019 | Cheng-Shorland | | G06Q 50/16 |
| 2019/0080407 A1* | 3/2019 | Molinari | | H04L 9/3239 |
| 2019/0123895 A1* | 4/2019 | Blake | | H04L 9/0637 |
| 2019/0238525 A1* | 8/2019 | Padmanabhan | | H04L 63/101 |
| 2019/0272085 A1* | 9/2019 | Radhakrishnan Lakshmi | | G06F 3/0486 |
| 2019/0303621 A1* | 10/2019 | Baset | | G06F 11/1479 |
| 2019/0320037 A1 | 10/2019 | Nair | | |
| 2020/0065697 A1* | 2/2020 | Watson | | G06Q 10/06393 |
| 2020/0097951 A1* | 3/2020 | Abramson | | G06Q 30/0207 |
| 2020/0127826 A1* | 4/2020 | Ebrahimi | | H04L 9/0894 |
| 2020/0134656 A1* | 4/2020 | Padmanabhan | | H04L 9/0637 |
| 2020/0155944 A1* | 5/2020 | Witchey | | A63F 13/86 |
| 2020/0167319 A1* | 5/2020 | Fritz | | H04L 41/30 |
| 2020/0193271 A1* | 6/2020 | Allen | | G06F 30/27 |
| 2020/0213251 A1* | 7/2020 | Shah | | G06N 20/00 |
| 2020/0349147 A1* | 11/2020 | Vukich | | H04L 9/3239 |
| 2020/0396195 A1* | 12/2020 | Goel | | H04L 51/58 |
| 2021/0105246 A1* | 4/2021 | Nair | | H04L 9/3297 |
| 2021/0126983 A1* | 4/2021 | Bellet | | G06Q 10/101 |
| 2021/0141820 A1* | 5/2021 | Vora | | G06F 40/216 |
| 2021/0144149 A1* | 5/2021 | Simons | | H04L 63/12 |
| 2021/0192412 A1* | 6/2021 | Krishnaswamy | | G06Q 10/06375 |
| 2021/0201354 A1* | 7/2021 | Maliszewski | | G06Q 30/0244 |
| 2021/0287274 A1* | 9/2021 | Nguyen | | G06N 3/04 |
| 2021/0357954 A1* | 11/2021 | Mousset | | G06Q 30/0207 |
| 2022/0245044 A1* | 8/2022 | Mabry | | G06F 11/3051 |
| 2022/0311727 A1* | 9/2022 | Agarwal | | H04L 51/214 |
| 2022/0327009 A1* | 10/2022 | Beard | | G06F 12/023 |
| 2022/0383405 A1* | 12/2022 | Head | | H04L 51/216 |
| 2023/0063525 A1* | 3/2023 | Fernandes | | B61L 15/0027 |

* cited by examiner

US 11,924,159 B2

SYSTEM AND METHOD FOR UNIFIED MULTI-CHANNEL MESSAGING WITH BLOCK-BASED DATASTORE

CROSS REFERENCE TO RELATED APPLICATIONS

The present application is a continuation application of U.S. patent application Ser. No. 16/591,608, filed Oct. 2, 2019, and is incorporated in reference in its entirety.

TECHNICAL FIELD

The present disclosure generally relates to messaging center and more specifically, to the messaging centers using multi-channel messaging with block-based datastore.

BACKGROUND

Nowadays, with the proliferation of devices, customers often rely on electronics for communication with a customer service agent for account or transaction resolution. In most instances, a user may use a chat session, email, or phone call to try and resolve the issue at hand. This solution however, is often fragmented and requires the user to either wait on hold, restate the issue multiple times, or be delayed in waiting for an email response. Such delay in time may lead to a poor customer experience, a loss of company goodwill, and added expenses as duplicates in architecture and data stores may exist as the customer attempts to communicate over different channels. Thus, it would be beneficial to have the capability to present a user and service agent with a unified messaging experience that can extend across multiple channels with a combined datastore.

Figure 1:
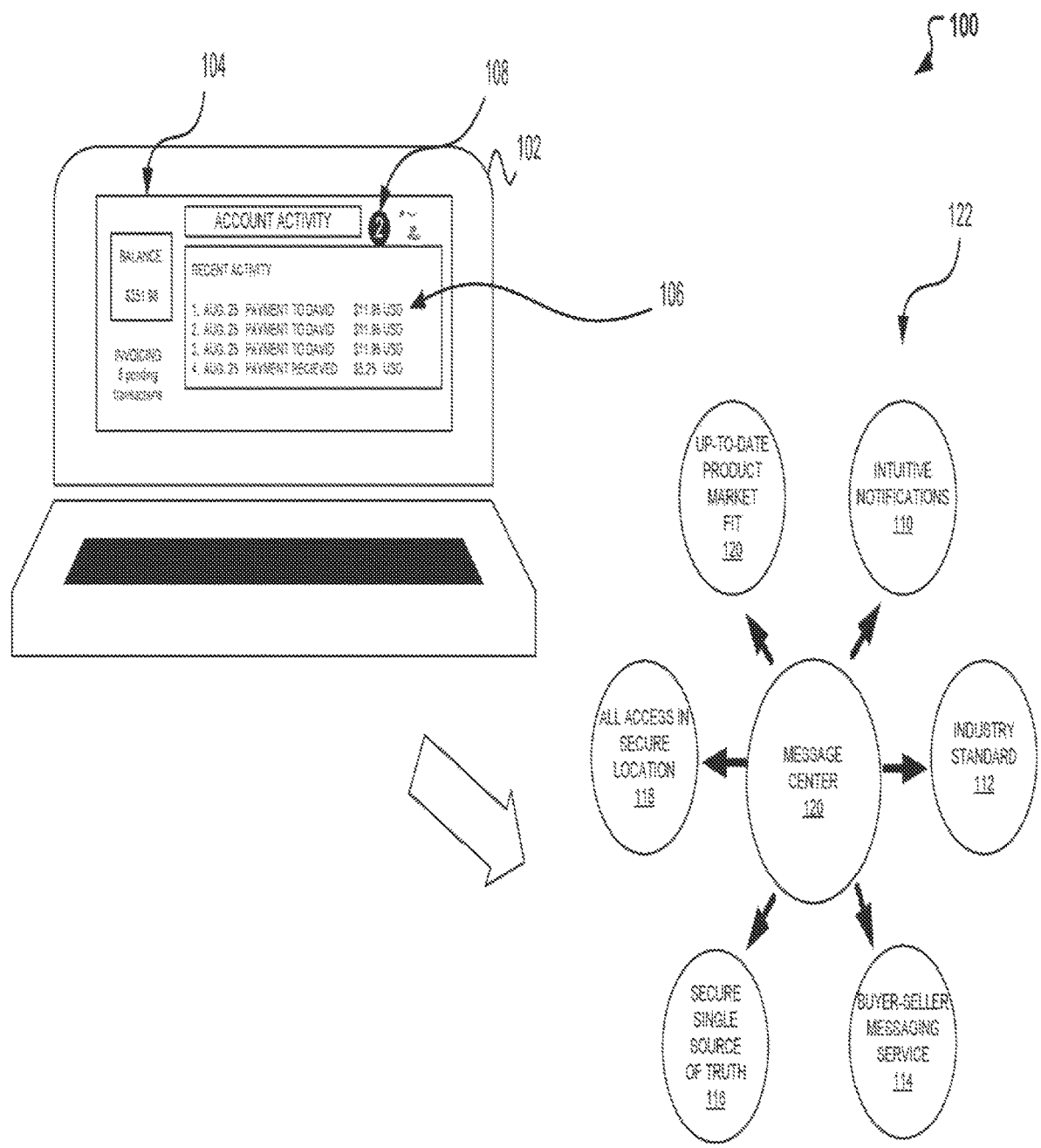
FIG. 1 illustrates an exemplary messaging center application and solution.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for communicating with a unified messaging center using multi-channel messaging with block-based datastore. In one embodiment, a system is introduced that can provide a unified experience and capability for messaging with one or more entities across platforms. The messaging capability includes the ability to provide user interaction using a single architecture with data store in a centralized form. In one embodiment, the data store includes the use of blockchain technology wherein each interaction with the user and across platforms is recorded and stored on a crystographed block.

In general, messaging centers are platforms designed to provide a user with an interactive user interface and customizable homepage where the user can naviate through account information and obtain help via a live chat, email, chat bot, etc. In particular, messaging centers have become a prevalent and secure channel presented to users for contacting, inquiring, and requesting information about a pending transaction or other inquiry on a user's account. Such messaging channel however, may be quiet fragmented requiring a user to restate their question or issue as the user is transferred between bot and agent, between agents, across emails, and between varying channels. In addition, the messaging center may require multiple data stores, duplicate architectures, and various agent's time as a user's data is accessed and resolution is to be determined. Therefore, a method and system for unifying a user's communication and data is important.

Conventionally, messaging centers may be accessed on a user device via an interactive interface using at least a messaging application available on the interface. FIG. 1 presents an exemplary messaging center application interface and solution 100. In particular, FIG. 1 illustrates a user device 102 with messaging center interface 104. The user device 102 may be a tablet, iPad, cell phone or the like. For exemplary purposes, user device 104 can be a smart phone or laptop. The user device 102 may be equipped with various applications for performing various tasks. For example, the user device 102 may be used for web browsing, video streaming, bill payments, and online purchases. Additionally, the user device 10 be equipped with applications that enable the user to make purchases and transfers using a payment provider application and/or a digital wallet, and/or access application with the payment provider, merchant, messaging center, etc. Further, the user device 102 may be capable of making phone calls and communicating with one or more other communications devices using a cellular network, Wi-Fi, Bluetooth, BLE, NFC, WLAN, etc. For example, in the communication the user may communicate via the user device 102 with a service agent, bot, or other at an application dashboard of a messaging center 104. In the exemplary message center dashboard 104 of FIG. 1, for example, a user can review account activity associated with a payment processing service. The account activity can include information about a user's account balance, invoicing, and other recent activity 106. At this messaging center dashboard 104, the user may also message, chat or otherwise communicate with customer service agent regarding their account. As illustrated FIG. 1, the user may also be flagged on pending notifications 108 regarding previous communications with the customer service center representative. Note that the term customer service representative is being broadly used to represent a bot, agent, or other entity which may be used in communicating with a user/customer. In some instances, the term customer service agent may be interchanged with the term customer service user or simply agent.

In this particular example, there may exist two pending notifications 108 for the user, which may relate to a user's recent activity 106 and in particular to the repeated charges received on Aug. 25 for $11.95. These notifications 108 may be selected and may route a user to an inbox like interface where previous user interactions and communications with customer service regarding the communication on the recent activity. At the inbox interface, a user may have a safe and secure space or messaging channel where user account information may be openly discussed, issues resolved and previous communications displayed.

However, in some instances, a unified solution 122 and message center 120 that extends beyond centeralized messaging may be needed. Unified solution 122 provides some exemplary benefits and features that may be available when a message center 120 extends beyond centralized messaging. For example the unified solution 122 may include intuitive notifications 110, serve as an industry standard as a customer service model 112, provide buyer-seller messaging services 114, act as a single safe and secure channel ("source-of-truth") 116, provide access to all messages in one location 118, and provide up-to-date product market reports and information 120. Therefore, secure documentation upload is available, security obejctives and regulations are met (e.g., European Central Board), phising is more easily combatted and avoided as account messages securely reside in a unifed location, and asynchronous communications is enabled as emails, messaging transcripts, etc. reside in a single repository. In addition, in instances where the messaging center is applicable to a payment provider service, business partners can directly and securely communicate and email customers, communications and receipt of those communications may be tracked, and document and other attachements (e.g., receipts, screen shots, jpgs., etc.) may be securely uploaded in a compliant manner.

Figure 2:
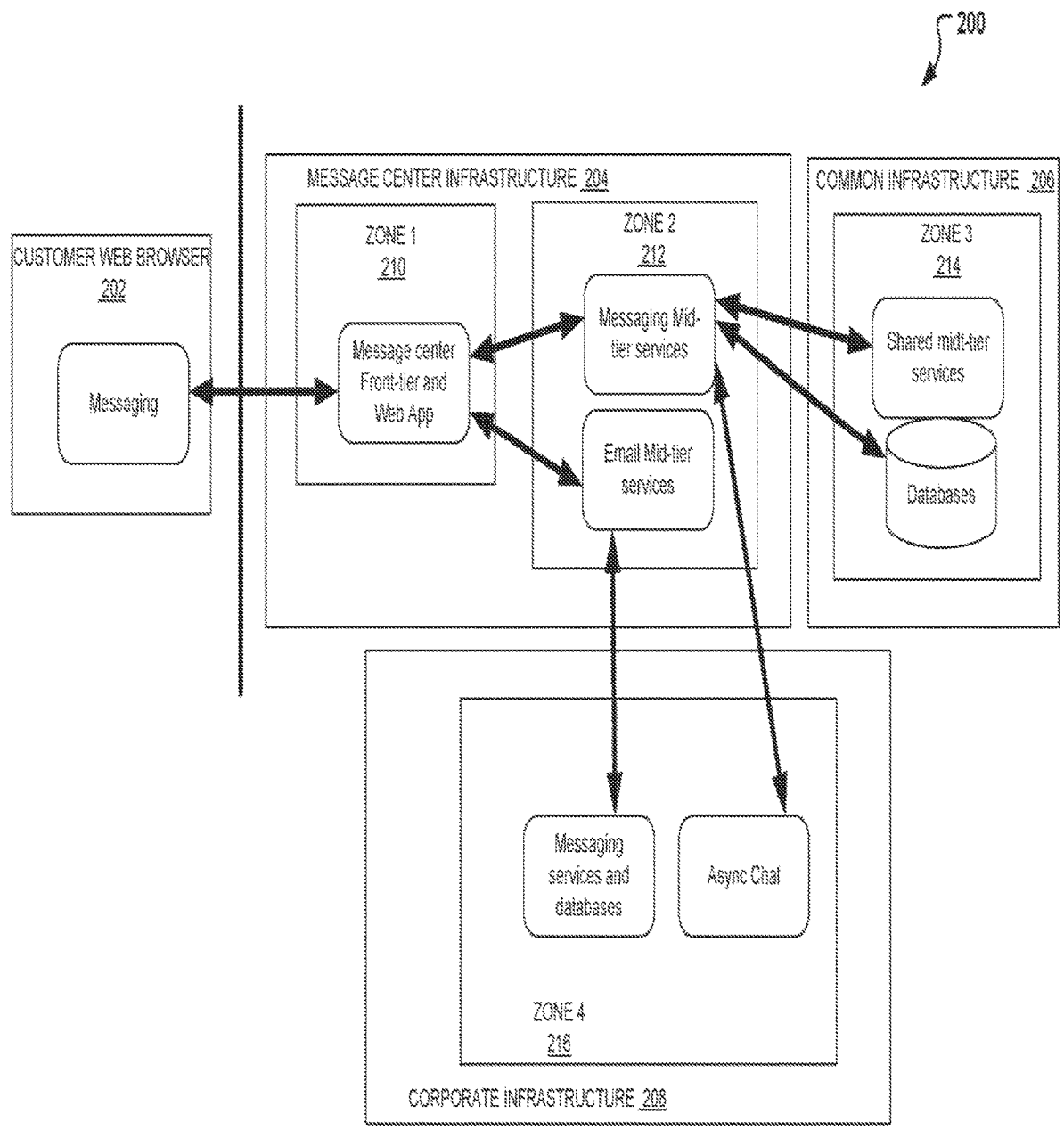
FIG. 2 illustrates a block diagram illustrating an exemplary messaging center architecture.

To enable such enhancements however, an architecture that may support such unified solution is important. Therefore, turning next to FIG. 2, a block diagram illustrating an exemplary messaging center architecture 200 is presented. As illustrated in FIG. 2, the exemplary messaging center architecture 200 can include a series of infrustructures that can work together to provide the unified experience. At the front-end the payment provider infrastructure or other entity supporting the messaging center, first interact with the end-user via a customer web-browser 202 or other application interface on the user device 102. Illustrated here, a user may interact with a messaging center and in particular the messaging center infrusture 204 via a messaging channel. The messaging can include live messages, short message service (SMS) messging, chat bot messaging, and/or other forms of communication including but not limited to email, posts, etc.

At the messaging center architecture 200, the message sent and communicated by the user at the customer web browser 220, may be received by a first receiving infrastructure. This first receiving infrustucter can include, for example, the messaging center infrastructure 204. The message center infrastructure 204 may operate under two zones, a first tier zone (e.g, zone 1 210) and a second tier zone (e.g., zone 2 212). The first tier zone 1 210, may be a first module encountered by the the received message sent by the user at the customer web browser 202. This zone may work as an interface with the user, wherein the information (e.g., message) is received at a front-tier and adequately routed to the second tier zone 2 212. For example, the front-tier may perform some operation management to determine if the message is a chat conversation or a live messaging conversation. If the messaging was via a chat bot then chat bot assistance may be provided including the start of a bot conversation. Alternatively, if an email was received, then this communication is also adequately routed. In instances where help center or messaging center help is requested, the identification and transmission of help articles may also be delivered. Additionally, the front-tier may receive the attachements (e.g., jpgs, receipts, screen shots) included in the message and correctly route them for continued processing and resolution. To adequately route the incoming communications or messages, the font-tier may talk with the mid-tier secure messaging service to provide a gateway to the second tier zone 2 212 still within the message center infrastructure 204.

At the second tier zone 2 212, mid-tier messaging and email services may exist. It may be within this second tier zone 2 212 that not only messaging, but also bot and email communications may be routed and queued. For example, if the messaging at the customer web browser 202 initiates with a bot request, then first tier zone 1 210 may take the communication and route it to the correct service with in the mid-tier second tier zone 2 212. Then at the mid-tier second tier, once the bot conversation is initiated, the communication can be routed to the correct queue and a time estimate provided.

Further to the mid-tier messaging and email services, the communication may continue to a corporate infrastructure where another second tier may exist and bi-directional communication may occur between the mid-tier second tier 212 of the message center infrastructure 204 and a zone 4 216 located within the corporate infrastructure 208. At the zone 4 216 within the corporate infrastructer 208 a chat widget or other may be available for messaging and other asynchronous communications. In addition, email stores, chat and other conversations and access to inbox views may also exist and available at the corporate infrastructure 208.

Also part of the messaging center architecture 200, may be a common infrastructure 206. Again, because user account information and details may be exchanged with at least the second tier zones (e.g, zone 2 212 and zone 4 216), common infrastructure may also include another second tier zone (e.g., zone 3 214) where shared mid-tier services and other databases may exist. For example, at the common infrastructure 206, all domain services, APIs for profile updates and for interacting with one or more databases, and domain driven models may reside. Additionally, payment and other financial information may be stored and mid-tier services evoked. As such, bidirectional communication is also a common action that occurs between the messaging center architectrure 200 infrastructures 204, 206, and 208.

Note that the messaging center architecture 200 described herein is an exemplary architecture of what a unified messaging center architecture may look like. The messaging center architecture 200 is therefore not limited to the modules, zones, and infrastructures described herein and can include more or less components as may be necessary for perfoming and enabling unified messaging.

Figure 3:
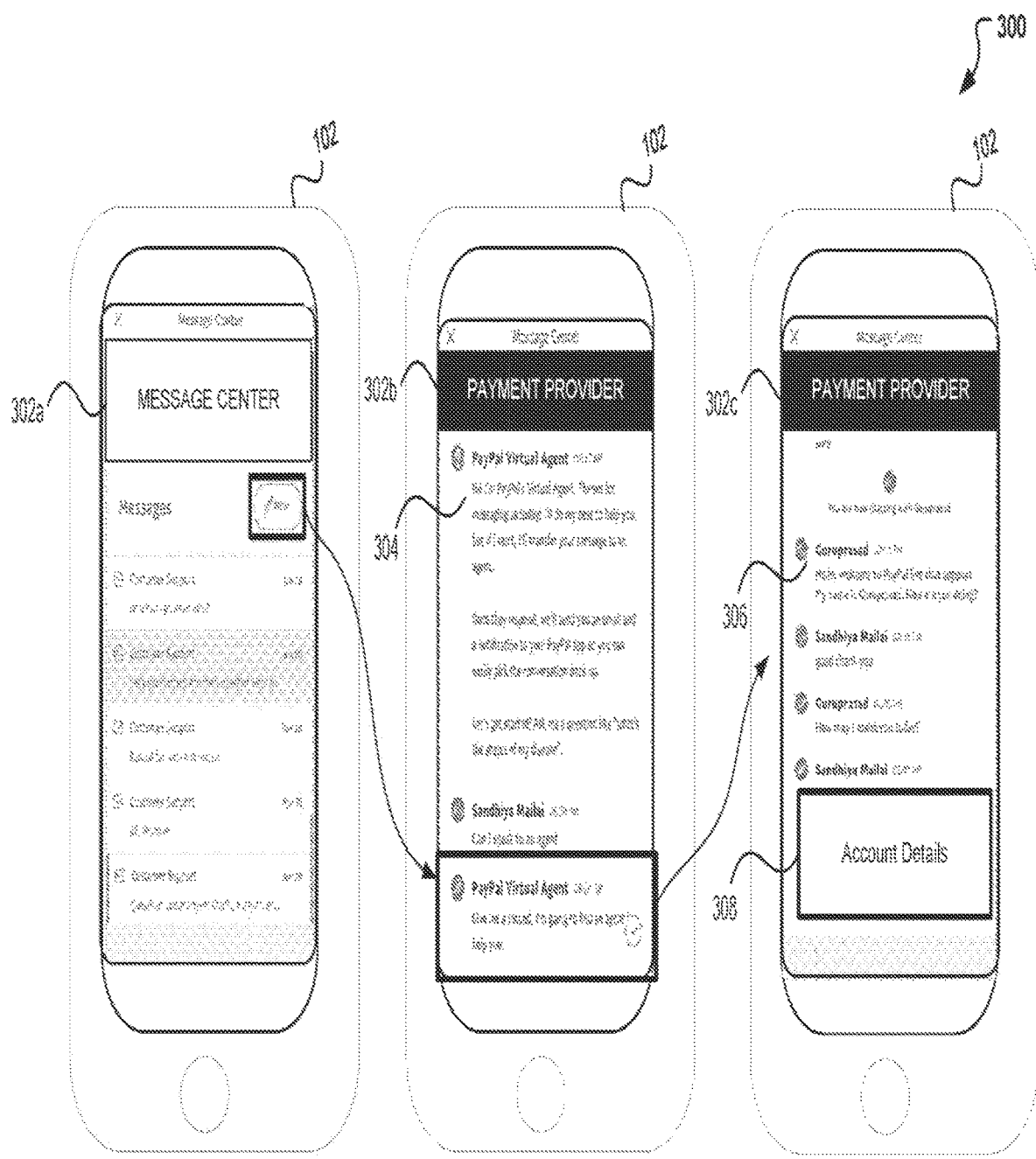
FIG. 3 illustrate exemplary interactive interfaces generated by the messaging center for unified messaging.

Turning now to FIG. 3, an exemplary interactive communication that may occur over the unifed messaging center is presented. In particular, a user device 102 is illustrated with the various interactive interfaces that may be encountered as the user journeys through the messaging center for customer support.

As illustrated in FIG. 3, a user on user device 102 may begin a communication at the messaging center interactive interface 302. Note that the messaging center interactive interfaces 302a-302c will be collectively referered to as messaging center interactive interface. Additionally, or alternatively, the messaging center interactive interface 302 may also refer to a home page of the messaging center which may provide a dashboard like presentation and available for accessing the interfaces as presented and as illustrated in FIG. 3.

Therefore, the messaging center interactive interface 302 may provide a user with a view of recent activity including those communications occurring with customer support. In addition, although not illustrated here and referencing FIG. 1, a user balance, pending invoicing, and other activity may be visible on the messaging center interface 302. Alternatively, the user may be presented with the messaging center interactive interface 302 upon actuating a notification button, submitting a request, entering a separate or pull down menu, as a result of a pop-up notification, etc.

Once at the messaging interface 302a, the user may be presented with the various messages and communications that may have occurred with customer support. As illustrated, the messages may derive from instant messaging, chat bot messaging, email, etc. Therefore, the user may have the option to select one or more messages to see communication history and even for the continued communication with customer support regarding questions or issues at hand. Alternatively, at the messaging interface 302a, the user may start a new message. The new message may be regarding a new matter, inquiry, problem, or even an existing one which is yet to be resolved.

With the use of the unified messaging center and the selection of a new message, the user may be connected with a virtual agent 304. This virtual agent 304 may be presented to the user during front-tier 210 communication wherein the user's queries and communications are beirng queued to the appropriate channel. As an example, at messaging agent interface 302b, the user may be greeted by the virtual agent 304. The virtual agent 304 can therefore gather user inquiry details, pull user information, provide help references, and/ or determine if a real agent may be needed. In this example, the user requested to speak to an agent 306. Thus, messaging may then move to the mid-tier messaging services of FIG. 2, wherein the message is routed and queued. As illustrated at the messaging agent interface 302b, the virtual agent may respond with an acknowledgement and request time to find an agent. The messaging may then continue to the inquiry interface 302c where the user can communicate over his/her user device 102 with the live agent 306. At this point the user has the opportunity to send and request account information, include attachements, and provide/obtain other account specific details 308 in a single secure and compliant channel. Additionally, although not illustrated here, the user may leverage the messaging center to receive and/or message a merchant directly, continue and followup on previously started inquiries, and received support across multiple channels.

Figure 4:
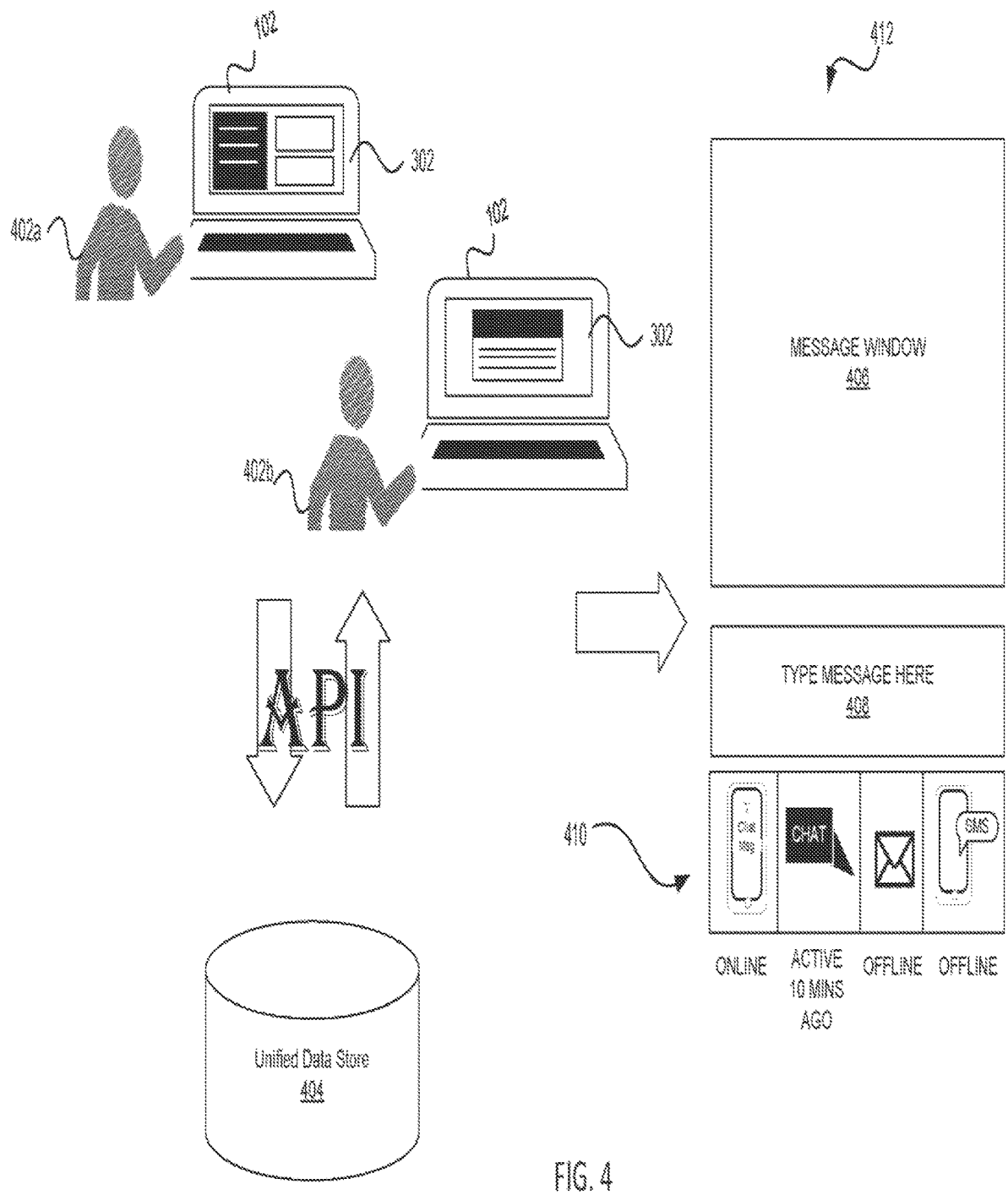
FIG. 4 illustrates a block diagram illustrating exemplary messaging and datastore.

Thus, turning next to FIG. 4, an exemplary communication via the messaging center interface 104 across multiple channels is illustrated. Most specifically, FIG. 4 illustrates a block diagram illustrating exemplary messaging with unified datastore. As previously indicated, the unified messaging center includes the communication between users 402, including at least a user 402a associated with an account service user or simply agent 420b, regarding account inquiries. Note that in some instances, the communication may also include a bot, or virtual agent. The account inquiries may include correspondence via email, chat, SMS, chat, etc.

For example, a user 402a may include a request for a clarification of a charge on an account. The user may therefore begin a conversation via chat, the chat may then route the user to some online literature and then route the user once more to a virtual agent. The virtual agent may then send the user an email with documentation regarding the charge in question via email. After the email is reviewed, the user 402a may determine further details are needed and contact the service agent user 402b. As the resolution for this inquiry takes place, the user has been routed through a series of channels and agents. Thus, in order to avoid redundancy, the unified data store 404 is presented herein wherein the service agent user 402b may obtain user inquiry information in a centralize manner without the need for the user 402a to replicate the actions or restate the history of communication that has taken place. As such, when the user 402a contacts the service agent user 402b, the unified agent messaging center interface 412 may be presented to the service agent user 402b with visibility across the various channels as illustrated on the channel display 410. A messaging window 406 and message input 408 may also be presented as the service agent user 402b communicates with the user 402a.

To facilitate the communication, a built in application program interface (API) may be used with a set of subroutines, definitions, and communication protocols for communicating across the various channels and with the unified data store 404. The built in API may be a unified messaging API allowing the communication between the unified messaging inbox at the user's messaging center interface and the service agent user's unifed agent messaging center interface. The unified data store 404 may be a centralized database system, server, cloud, of other nodes and distributed storage system designed to manage and store the account information and communication details associated with a user 402a and corresponding account.

In one embodiment, and in response to the user 402a inquiring about an account or requesting account resolution, a service agent user 402b may also reach out to and attempt to communicate with the user 402a. In some instances where email communication has occurred, the correspondence with a user 402a may be lagged. Therefore, with the inclusion of the unified agent messaging center interface 412, the service agent user 402b is able to determine a best channel to use to rapidly communicate with the user 402a. As an exemplary embodiment, the unified agent messaging center interface 412 can include a display of the various channels available for communicating with user 402a. As illustrated here, the service agent user 402b is able to communicate with a user 402a via chat messages, email, SMS, etc. Thus, a user 402a availability status may be determined and communicated with more rapidly. As such, in this exemplary embodiment, the user 402a, may be online and available via chat messages, inactive via chat, and offline and unavailable via email and SMS. As a result, the customer service agent user 402b may directly contact the user 402a via chat message and the delay encountered for account resolution is minimized.

Note that availability and status of a user 402a may be obtained after proper permissions and access have been provided by the user 402a. In addition, permissions regarding the content and use of the account may also be controlled by the user 402a. Therefore, a user may designate what information may be discussed and/or updated by the service agent user 402b. For example, the customer service agent 402a, may be provided with the ability to view a balance, view and edit the user profile, discuss the account information and view transactional data.

In some embodiments, the communication within the message center may also include a communication between the user 402a and a merchant. Thus providing a secure channel where the user and the merchant may communicate in a secure and compliant environment. In this embodiment, the merchant may also be grant some or all the permissions provided to the service agent user 402b for inquiries and discussions regarding the user's account.

Still in other embodiments, the communication may extend across platforms and into social media channels. For example, a user may communicate and/or include availability across applications and platforms including but not limited to Facebook™ messenger, Android™ messaging platform, and Whatsapp™. Consequently, the status of the user on these platforms may also be provided to the service agent user 402b and/or merchant.

Figure 5:
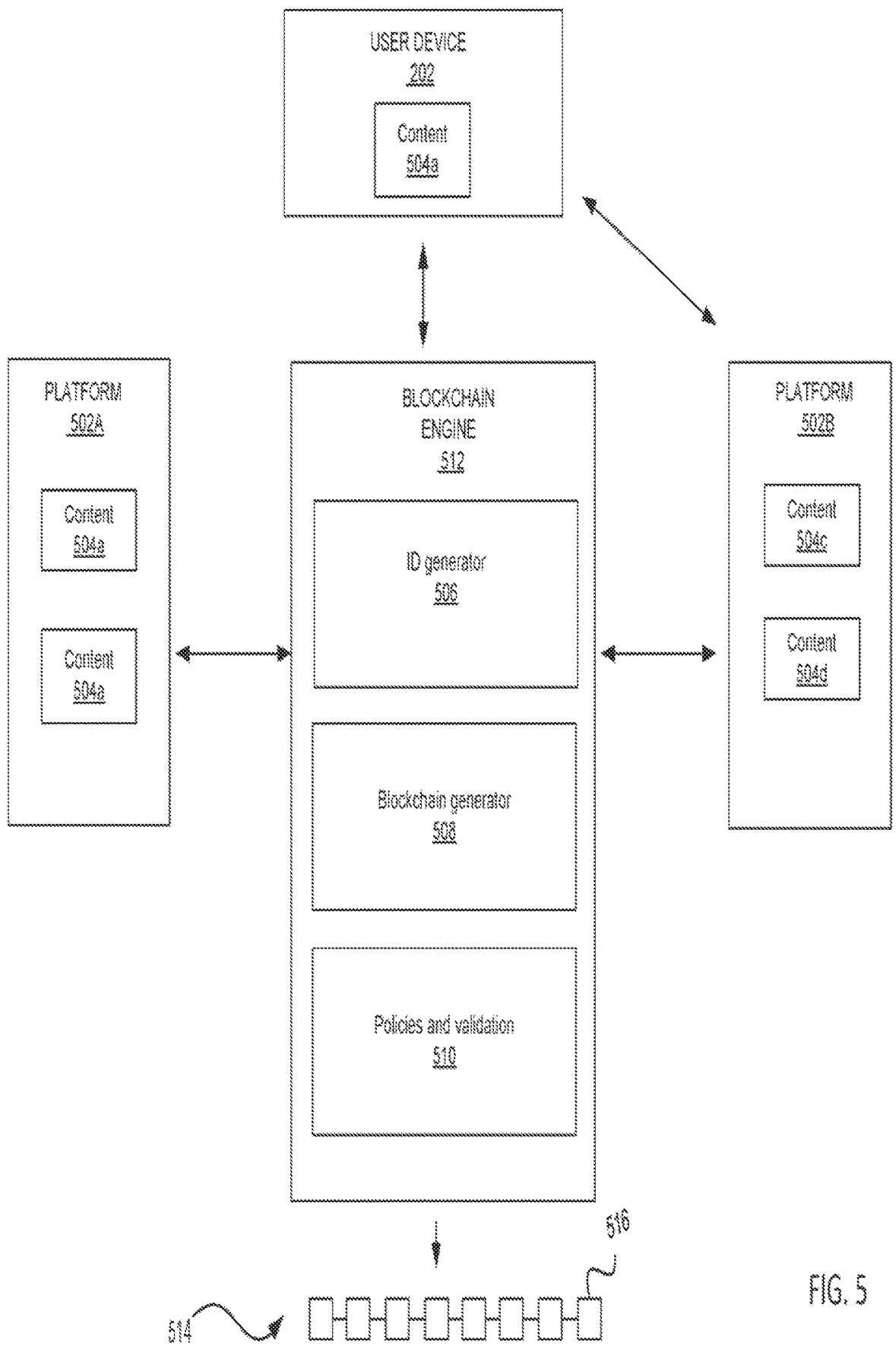
FIG. 5 illustrates an exemplary block-diagram illustrating blockchain datastore.

Because user account compliance is of outmost importance, the unified datastore may be extended for and/or used in conjunction with blockchain technology. FIG. 5 presents one such configuration, where a blockchain engine may be used in the storage and interaction with the various platforms. In particular, FIG. 5 illustrates an exemplary block-diagram illustrating blockchain datastore.

As generally illustrated in FIG. 5, the blockchain engine 512 may permit the sharing and storage of content 504 from the various platforms 502 and with the user device 102 associated with user 402a and/or the service agent user 402b. More specifically, the block chain engine 512 may provide a user 402 content 504 associated with the user account and availability. In one embodiment, the block chain engine 512 may include an ID generator 506, a blockchain generator 508, and a policies and validation module 510. The ID generator 506 may generate a content identifier (not shown) associated with the content 504 communicated between the platforms 502, devices 202, systems, and engine and stored on a blockchain 514. The content identifier may be in binary, numeric, or alphanumeric.

The blockchain generator 508 may be used to generate the blockchain 514. The blockchain 514 may be a continuously growing list or records or blocks which are linked and secured using cryptography. In one embodiment, the blockchain 514 may contain a cryptographic hash of the previous block, a timestamp, and current content 504. For example, each block 516 in blockchain 514 may contain a separate conversation, an attachment, a query, or other associated with a communication with a user 402a of an account. In some embodiments, the block may be associated with a communication on one of the platforms 502A and its associated content 504a-504b. Additionally, another block maybe be associated with another communication between another platform 502B and its associated content 504c-504d. Alternatively, a sidechain may be included and used for another communication with the another platform 502B and its associated content 504c-504d. The content 504e may then be maintained in the blockchain 514 and in some instances shared directly with the user device and/or accessed indirectly through the blockchain 514. A timestamp may also be indicated on the block 516 with regards to when it was created, and/or the time the conversation, email, or other exchange occurred.

A policies and validation module 510 may also be used in association with the block chain engine 512. This policies and validation module 510 may be used for ensuring correct, compliant, and controlled information/content is stored in the blockchain 514. In one embodiment, document share should meet compliance, policies and standards. In another embodiment, customer account detail storage should meet restrictions based on regions or security standards (e.g., Payment Card Industry (PCI) Standard). In one example, protection protection may be provided by the blockchain. In such example, the security measure may be executed as a user 402 is interacting with the unified messaging center and provides bank account details while on a Facebook™ messenger or other social media platform. Such share of information may be prohibited from being stored on a blockchain 514, as such, a PCI Standard inspection mechanism may be available and included in the policies and validation module 510 to ensure such information is not shared, posted, and/or stored. For example, in this instance, the PCI Standard inspection mechanism may trigger such policy violation and as such disdables the block 516 which included the account information. In this example, where the block is disabled the hash may be modified and a duplicate block created with the bank account details and other prohibited information masked or erased. In another example, the PCI standard inspection mechanism may identify this violation and block the ability to save to the block all together. Therefore, the blockchain generator may have mechanisms in place for correct blockchain generation and usage.

The blockchain engine 512, may also be used to ensure correct storage of information occurs. In some embodiments a user 402a may be interacting with the service agent user 402b and documents, emails, and the sort may be exchanged without between the users 402 within or across platforms. As such, the blockchain engine 512 may also be used to track the communication including the emails, documents, and other relevant information that was exchanged. In such embodiments, the blockchain engine 512 may also create a block with corresponding ID indicating that an email was exchanged with a description and/or inclusion of the email. Similarly, if a document was included, article provided, or account updated, a block may be created to track the actions between the users 402 and/or on the account. Note that other actions, policies, and validations may also occur which are not included here. The examples provided are presented here for reference as exemplary capabilities available by the system.

Figure 6:
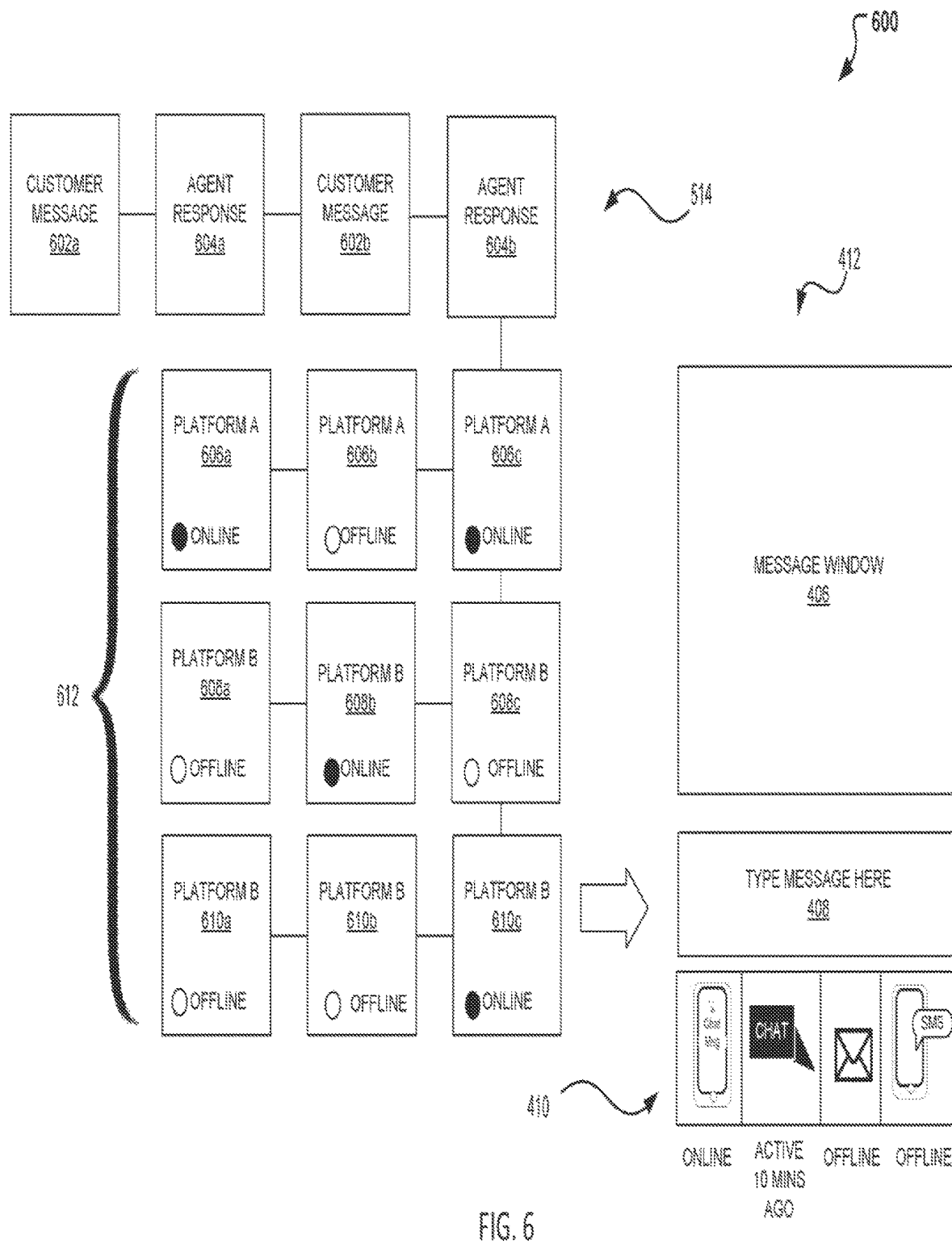
FIG. 6 illustrates an exemplary block-diagram illustrating multi-channel blockchain datastore.

Turning next to FIG. 6, an exemplary communication across the various platforms on a blockchain is provided. In particular, FIG. 6 illustrates an exemplary block-diagram 600 illustrating multi-channel blockchain/unified datastore. As illustrated, a blockchain 514 is presented here to illustrate, track and store a communication between a user 402a (illustrated here as customer) and a custormer service user 402b (illustrated here as agent). In the exemplary block diagram 600, a communication between he users 402 is presented and the method for tracking and datastore presented. For example, consider a user 402 in need of help resolving a duplicate charge. The user 402a begins the conversation with a request via bot through the messaging center interactive interface 302. This initial request may be received and stored in a corresponding customer message block 602a. As the bot responds and determines the user's needs, the response may be logged at agent response 604a. The user 402a, may then require more specific information and request an agent, a block detailing the request may be stored at the customer message block 602b. In response an agent is connected and determines that some account information may need to be retrieved and terminates the conversation to avoid the hold. This exchange is logged at agent response 604b. Thus, as resolution to the user's request takes place, the communication and exchange is logged and tracked over a series of blocks. Additionally or alternatively, the information may also be logged in a centralized datastore.

Returning to FIG. 6, in the example, the conversation concluded. However, the user's request may remain pending as the agent (service agent user 402b) clarifies, finds, or identifies the additional information needed to address the user's request. As the agent identifies the information, he/she may rely on the use of the unified agent messaging center interface 412, as previously introduced for a unifed view and visibility across the various channels as illustrated on the channel display 410. A messaging window 406 and message input 408 may also be presented as the service agent user 402b communicates with the user 402a. Thus, the unified agent messaging center interface 412 may provide the service agent user 402b with the ability to locate and determine a user's availability for a quick request resolution. At FIG. 6 for example, various platforms are illustrated where a user 402a may be available. As illustrated here, the service agent user 402b is able to communicate with a user 402a via chat messages, email, SMS, etc. At the blockchain, the various channels/platforms would also be mimicked and available for tracking the user interaction in the form of a sidechain. The sidechains 612 may be blockchains separate from the blockchain 514, but still associated with the customer interaction. Thus, at FIG. 6, each sidechain may be used to represent a platform. Accordingly, sidechain 606 may represent the blockchain for a first platform A and its interactions with regards to the communication occurring between the customer (user 402) and customer service user 402b (agent). Similarly, sidechains 608 and 610 correspond to the blocks associated with platforms B and C respectively. Therefore, if time/availability is monitored and recordered on each sidechain for the corresponding chain, as the customer service user 402b communicates with the user 402a, the sidechain and corresponding block may be updated accordingly. In an alternate embodiment, the sidechain is created and updated as the user communicates on the specified platform. For example, if the user communicates via SMS, then sidechain supporting that platform will be generated and updated. As the number and types of platforms change, so will the sidechains and the corresponding blocks. In the example provided at FIG. 6 for example, the customer service user 402b may quickly see that user 402a is available online and may reach out via Chat messaging. If the communication occurs and information is exchanged, then the sidechain supporting such platform will be updated according. Thus with the online and immediate status available, a customer service user 402b is able to provide quicker and more efficient resolution to the user 402a while minimizing user 402a friction through the user and access to not only user availability but also account history in a centralized datastore and/or blockchain. In some embodiments, if the system detects that the user is transitioned to offline, autoforwarding may be incorporated where a message may be re-directed to the next available channel and corresponding sidechain.

Figure 7:
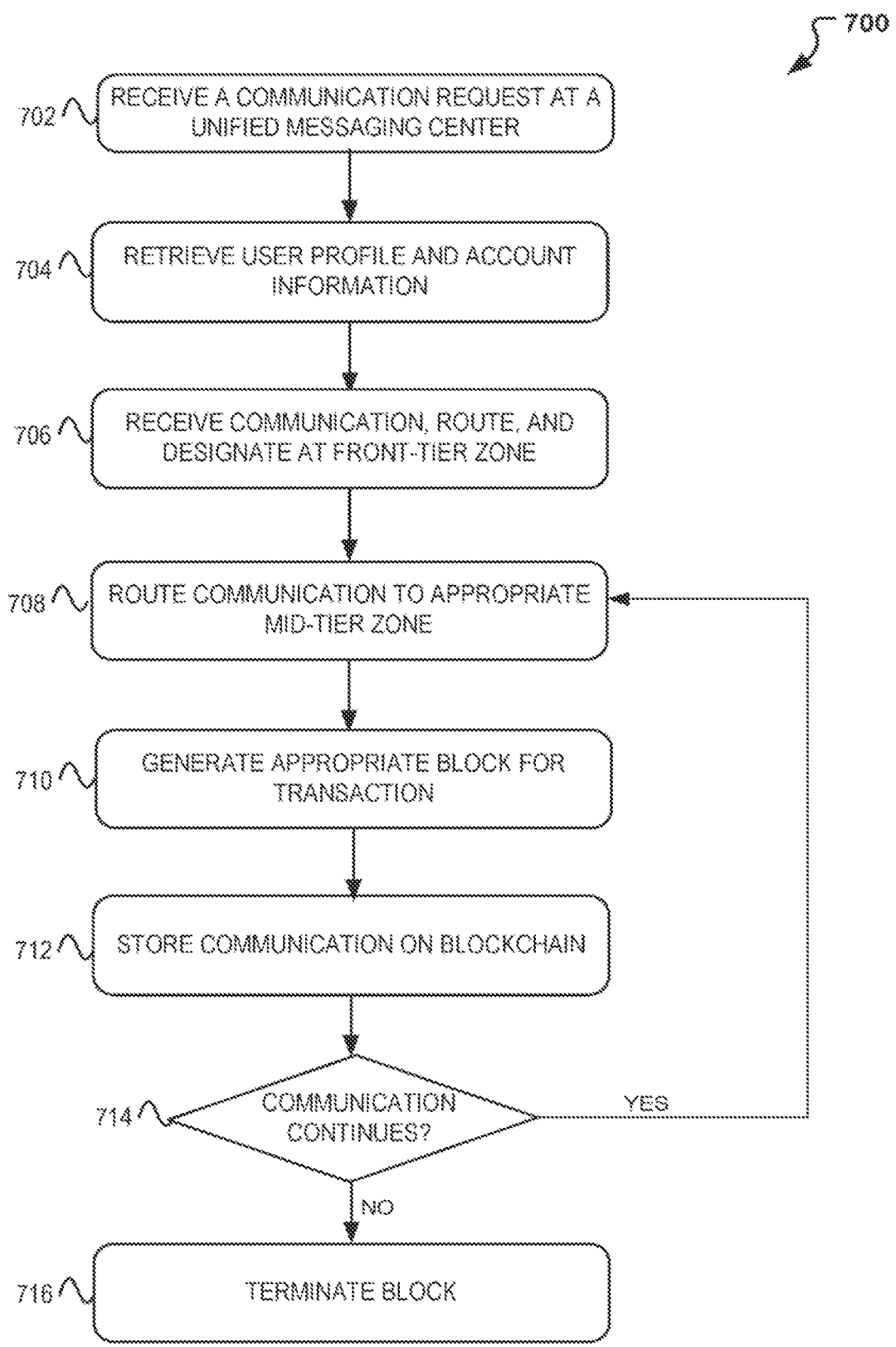
FIG. 7 illustrates a flow diagram illustrating operations for unified multi-channel messaging and block-based datastore.

Turning next to FIG. 7, the process for enabling such unified communication in a unified multi-channel messaging system is presented. In particular, FIG. 7 is a flow diagram 700 illustrating operations for unified multi-channel messaging and block-based datastore. Thus, FIG. 7 introduces an example process 700 which may be implemented on a system 800 of FIG. 8, with blockchain technology as described in FIG. 5 and with device 900 of FIG. 9.

According to some embodiments, process 700 may include one or more of operations 702-716, which may be implemented, at least in part, in the form of executable code stored on a non-transitory, tangible, machine readable media that, when run on one or more hardware processors, may cause a system to perform one or more of the operations 702-716.

To illustrate how the unified messaging system 200 may be used, process 700 is presented. Process 700 begins with operation 702 where a communication request is received at the unified messaging system 200. The request may be sent by a user 402a via a chat, bot, call, email, or other communication means available to obtain help on a question, problem, inquiry or concern regariding a merchant, payment provider, or other entity associated with the unified messaging center. By receiving the communication request, the unified messaging center may retrieve a retrieval instruction where at operation 704 user profile information and/or account details may be retrieved. For example is the user's communication request includes an inquiry about a payment made with a merchant, the unified messaging system may commence by obtaining the user details associated with the user and the specific payment in question. Note that in some instances, user information and account details may not be necessary as the inquiry may be a more general request which may be answered or addressed without the need to retrieve user information. Additionally or alternatively, the user 402a may not be a current customer thus account information and profile may not be available. As such, operation 704 may occur later in the process 700 or may be optional. In addition, note that in some instances, operation 704 may occur prior to the user account information and profile detail retrieval of operation 702. That is to say, the routing process may occur before user details are retrieved.

Once user information is retrieved (as necessary), process 700 may continue to operation 706. At operation 706, the communication moves to through the messaging center infrastructure where routing, reviewing, and restricted information may be reviewed. At the messaging center infrustucture, the message center front-tier zone may be encountered. As previously indicated, at the front-tier may perform some operation management to determine if the message is a chat conversation or a live messaging conversation. That is to say, the front-tier may be used to determine an inquiry type to route to the appropriate agent. For example, if the messaging was via a chat bot then chat bot assistance may be provided including the start of a bot conversation. Alternatively, if an email was received, then this communication is also adequately routed. In instances where help center or messaging center help is requested, the identification and transmission of help articles may also be delivered. Additionally, the front-tier may receive the attachments (e.g., jpgs, receipts, screen shots), correctly route them, and communicate with a mid-tier as necessary. Additionally, if a help message is sent and a chat bot is more appropriate to handle, routing between the agents may also occur based in part on the inquiry type. Also, if more than one inquiry is received or additional topics are detected, then routing may vary based on communication request.

At operation 708, to adequately route the incoming communications or messages, the font-tier may talk with the mid-tier secure messaging service. Again as previously indicated, the mid-tier may include a gateway to the second tier zone where account information, documents, and other more delicate conversations may take place. In addition, at the mid-tier second tier zone, routing to a bot, email, chat, etc., can occur such that once the communication is routed to a correct queue and a time estimate may be provided. The communication routed can include an interface or direct communication with merchants associated with the user. Emails, chats, and other communications may be stored, synchoronized and/or added the unified datastore. Additionally or alternatively, data may be stored on a blockchain.

At operation 710, as the communication has began between the user and the unified messaging system 200 and where the information is stored on a blockchain 514, communication may continue to the blockchain engine 512 where the appropriate cryptographic block and corresponding hash/ID may be generated. Recall that a blockchain 514 may be used for the storage of the communication with the unified messaging system 200, as indicated at operation 712. The use of the blockchain 514 is advantages as communication history may be stored and accessed as a user's account inquiry is yet to be resolved and avoids the need to replicate the exchange. In one embodiment, the blockchain engine 512 may communicate directly with the front-tier and/or the mid-tier as the communication is being routed such that the communication is checked and blockchain removed, updated, replicated, or not created based on the information included in the communication. Note that the blockchain 514 generation may also reside outside this operation and exist at an earlier operation when the unified messaging system first receives a request. Also note that one or more blockchains 514 may be generated as the user 402 has various inquiries or topics to address. In addition, if communication occurs over varying channels, the blockchain generation can include a sidechain. Similarly, as the unified messaging system is used in conjunction with one or more merchants, sidechains 612 may also be used and generated. These blockchains 514 and sidechains 612 may be generated in parallel as the user communication includes multiple topics and/or over multiple channes/platforms. The blockchains 514 and sidechains 612 may terminate and grow interminately as time lapse occurs between communications. Blockchains 514 may also exist in conjunction with the unified data store 404 (as necessary) such as that introduced in FIG. 4.

At operation 714, the process may check for additional communication occurring. Therefore, as more information is being exchanged between the user 402a and the unified messagin system 202, the process continues to operation 708 where the communication is again evaluated and routed. Alternatively, as the inquiry is addressed or communication is stalled, the process continues to operation 716 where the block is terminated.

Note that the operations presented at FIG. 7 are for exemplary purposes and more or less operations may be possible. In addition, the operations may exists in a different order. For example, operations may vary as the communication varies topics, status, channel, etc. and the generation of the block changes.

Figure 8:
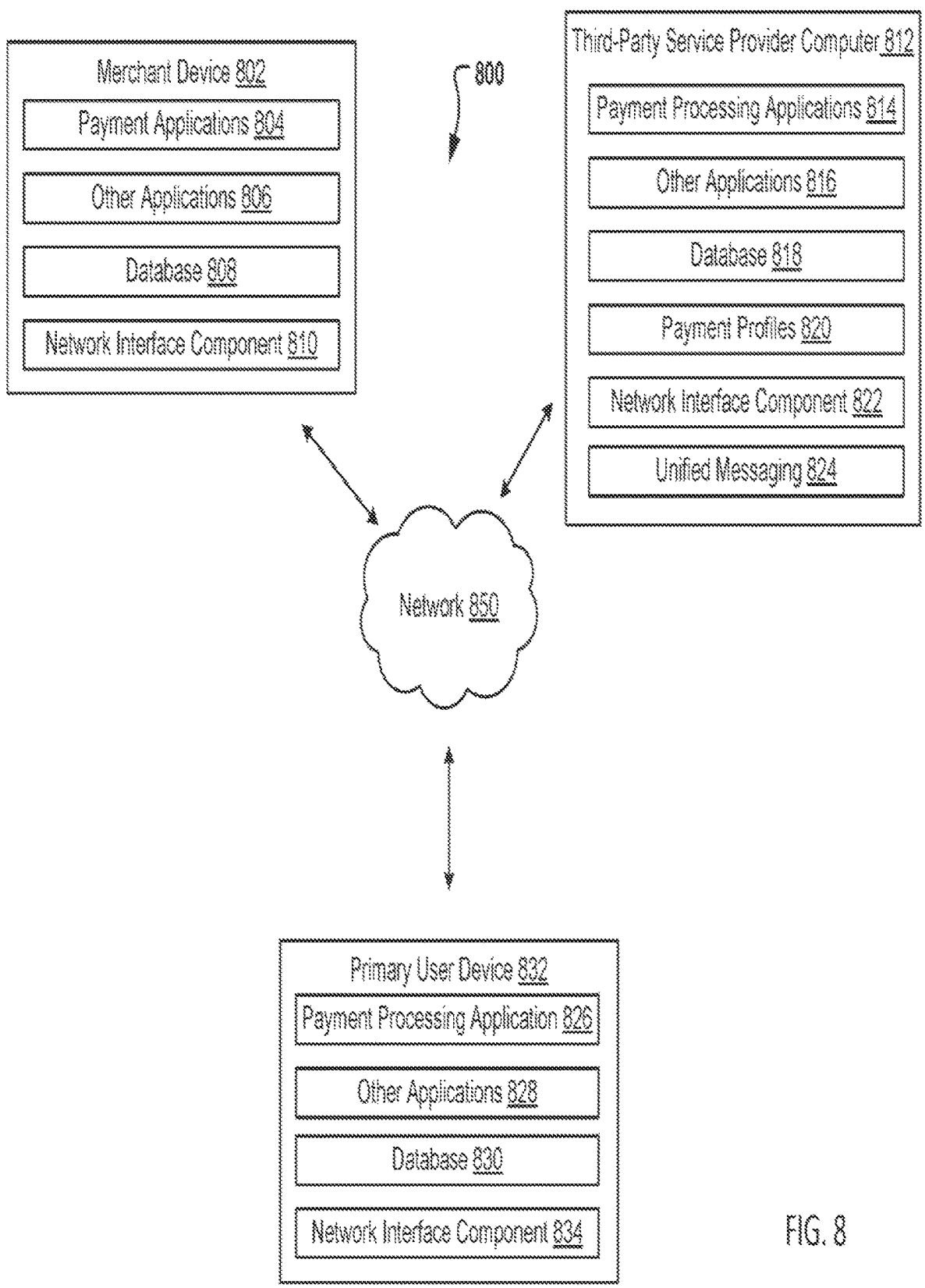
FIG. 8 illustrates a block diagram of a system for performing the block-based datastore.

Turning next to FIG. 8, an exemplary communication system is presented where the user 402a is communicating with a primary user device 832 with the unified messaging center 202 via a third party service provider computer 812 and a merchant device may be involved and communcaited with via merchant device 802. FIG. 8 is a block diagram of a networked system for implementing the processes described herein, according to an embodiment. In particular, FIG. 8 illustrates a block diagram of a system 800 for completing transactions and addressing user 402 inquiries. System 800 illustrates at least some of the interactions between multiple entities and/or devices as the inquiries are addressed. As shown, system 800 may include or implement a plurality of devices, computers, servers, and/or software components that operate to perform various methodologies in accordance with the described embodiments. It will be appreciated that the devices, computers, and/or servers illustrated in FIG. 8 may be deployed differently and that the operations performed and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 800 includes a merchant device 802, a primary user device 832 (e.g., user device 202), and a third-party service provider computer 812 in communication over a network 250. The merchant device 802, primary user device 832, and third-party service provider computer 812, may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 800, and/or accessible over network 850.

The merchant device 802 may be implemented as a communication device that may utilize appropriate hardware and software configured for wired and/or wireless communication with the primary user device 832, third-party service provider computer 812, and/or secondary user device (not shown). For example, the merchant device 802 may be implemented as a personal computer (PC), a smart phone, laptop/tablet computer, point-of-sale device, wristwatch with appropriate computer hardware resources, eyeglasses with appropriate computer hardware, other type of wearable computing device, implantable communication devices, and/or other types of computing devices capable of transmitting and/or receiving data. The merchant device 802 may correspond to and be utilized by a user, such as an employee of a merchant and/or another person authorized by the merchant.

The merchant device 802 may include one or more payment applications 804, other applications 806, a database 808, and a network interface component 810. The payment applications 804 and other applications 806 may correspond to executable processes, procedures, and/or applications with associated hardware. In other embodiments, merchant device 802 may include additional or different components having specialized hardware and/or software to perform operations associated with the payment applications 804 and/or the other applications 806.

The payment application 804 may facilitate financial transactions corresponding to the sale of goods and/or services offered by the merchant. For example, the payment application 804 may provide an interface for customers to purchase the goods or services and to receive customer payment information (e.g., customer credit card information). The payment application 804 may further transmit customer payment information to a payment processor (e.g., such as a payment processor corresponding to the third-party service provider computer 812 to process the customer payment information. The payment application 804 may also facilitate other types of financial transactions such as banking, online payments, money transfer, and/or the like.

The merchant device 802 may execute the other applications 806 to perform various other tasks and/or operations corresponding to the merchant device 802. For example, the other applications 806 may include security applications for implementing client-side security features, programmatic client applications for interfacing with appropriate application programming interfaces (APIs) over network 850, or other types of applications. The other applications 806 may also include additional communication applications, such as email, texting, voice, and instant messaging (IM) applications that enable a user to send and receive emails, calls, texts, and other notifications through the network 850. In various embodiments, the other applications 806 may include location detection applications, such as a mapping, compass, and/or global positioning system (GPS) applications, which may be used to determine a location of the merchant device 802. The other applications 806 may include social networking applications. Additionally, the other applications 806 may include device interfaces and other display modules that may receive input and/or output information. For example, the other applications 206 may include a graphical user interface (GUI) configured to provide an interface to the user and enable the use of one or more features for completing transactions between marketplaces. Still in other embodiments, the other applications may include an application used for communicating with the third-party service provider computer 812 for interfacing with the unified messaging center 202.

The merchant device 802 may further include a database 808, which may be stored in a memory and/or other storage device of the merchant device 802, in a unified datastore 404, and/or blockchain 514. The database 808 may include, for example, identifiers (IDs) such as operating system registry entries, cookies associated with the payment application 804, tokens, encryption keys, and/or other applications 806, IDs associated with hardware of the network interface component 810, IDs used for payment/user/device authentication or identification, and/or other appropriate IDs. The database 808 may also include information corresponding to one or purchase transactions of customers who have purchased goods or services from the merchant, browsing histories of the customers, or other types of customer information. In certain embodiments, the merchant device 802 may also include information corresponding to payment tokens, such as payment tokens generated by the third-party service provider computer 812 and/or generated by the secondary user device, server, or other system.

The merchant device 802 may also include at least one network interface component 810 configured to communicate with various other devices such as the primary user device 832, and the third-party service provider computer 812. In various embodiments, network interface component 810 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth®, Bluetooth low-energy, near field communication (NFC) devices, and/or the like.

The third-party service provider computer 812 may be maintained, for example, by a third-party service provider, which may provide payment processing services for the merchant. In one example, the third-party service provider may be provided by PAYPAL®, Inc. of San Jose, CA, USA. Alternatively, the third-party service provider computer 812 may be associated with a user of the user device 102. As such, the third-party service provider computer 812 includes one or more payment processing applications 814, which may be configured to process payment information received from the merchant device 802 or from a selection at the user device 102. For example, the payment application 804 of the merchant device 802 may receive payment information from a customer to purchase a service or good offered by the merchant. Upon receipt of the payment information, the payment application 804 may transmit the payment information to the third-party service provider computer 812. The payment processing application 814 of the third-party service provider computer 812 may receive and process the payment information. As another example, the payment application 804 can present a payment code on a display of the user device 102 associated with the merchant. The payment code can be scanned or transmitted to the merchant device 802 for payment processing. Still in another example, the payment provider may include an icon that may be squeezed, swiped, tapped, or other for the processiding of a transaction.

The third-party service provider computer 812 may execute the other applications 816 to perform various other tasks and/or operations corresponding to the third-party service provider computer 812. For example, the other applications 816 may include security applications for implementing client-side security features, programmatic client applications for interfacing with appropriate APIs over the network 850, or other types of applications. The other applications 816 may also include additional communication applications, such as email, texting, voice, and IM applications that enable communication of emails, calls, texts, and other notifications through the network 850. In various embodiments, the other applications 816 may include location detection applications, such as a mapping, compass, and/or GPS applications, which may be used to determine a location of the third-party service provider computer 812. Additionally, the other applications 816 may include device interfaces and other display modules that may receive input and/or output information. For example, the other applications 816 may include a GUI configured to provide an interface to one or more users in association with the unified messaging system 200.

The third-party service provider computer 812 may further include a database 818, which may be stored in a memory, other storage device of the third-party service provider computer 812, a unified datastore, blockchain, etc. The database 818 may include, for example, IDs such as operating system registry entries, cookies associated with the payment processing application 814 and/or other the applications 816, IDs associated with hardware of the network interface component 822, IDs used for payment/user/device authentication or identification, and/or other appropriate IDs. In some embodiments, the database 818 may be different and distinct from the unified data store and/or blockchain ans used for storing the IDs, etc., while the datastore and/blockchain may be more specific to user interactions, inquiries, requests, and other communications associated with the unified messaging system.

According to a particular embodiment, the third-party service provider computer 812 may include a set of payment profiles 820 corresponding to past sales transactions executed by the merchant device 802 with respect to one or more customers of the merchant. Alternatively, the third-party service provider computer 812 may include a set of merchant payment profiles corresponding to the payment sources associated to a corresponding merchant. For example, a particular payment profile from the set of payment profiles 820 may include payment information corresponding to a particular customer of the merchant and/or a merchant associated with a user. The payment information may include credit card information (e.g., card number, expiration date, security code, card issuer, and/or the like), Automated Clearing House (ACH) information (e.g., account number, routing number, and/or the like), identification information associated with the particular customer/user (e.g., a customer identifier, name, address, phone number, date of birth, and/or the like), billing information, and/or any other type of payment information associated with the particular customer which may not exist on the blockchain or maintained separately in the unified datastore. Furthermore, other payment profiles of the set of payment profiles 820 may include payment information corresponding to other customers of the merchant and/or other merchants associated with the user. In addition, the third-party service provider computer 812 may store the set of payment profiles 820 according to a first file format.

The third-party service provider computer 812 may also store a set of payment tokens corresponding to the set of payment profiles 820. For example, each payment profile of the set of payment profiles 820 may be associated with a corresponding payment token from the set of payment tokens. In some embodiments, each payment profile may include a corresponding payment token from the set of payment tokens. The set of payment tokens may be particular to the third-party service provider computer 812 (e.g., computers from other service providers may be unable to use the set of payment tokens) and may enable the merchant device 802 to more securely process payment transactions with the third-party service provider computer 812. For example, in order to process a payment transaction that involves a credit card number associated with a particular payment profile, the third-party service provider computer 812 may provide the merchant device 802 with a particular payment token that is different from the credit card number. The merchant device 802 may use the particular payment token to process the payment transaction instead of the credit card number. Further, the merchant device may store and associate the particular payment token with the particular payment profile instead of the credit card number, thereby protecting the credit card number from being stolen in a potential security breach of the merchant device 802.

In various embodiments, the third-party service provider computer 812 may also include a unified messaging component 824 designed to communicate, interface, and otherwise exchange information with the unified messaging system 200. In some embodiments, the unified messaging system 200 may be a subsystem within the third-party service provider computer 812. In other embodiments, the unified messaging system 200 may be an extension, separate system, extension, or the like of the third party service provider computer 812. As such, the unified messaging component 824 may be available for providing the communication between the systems 812 and 200.

In various embodiments, the third-party service provider computer 812 also includes at least one network interface component 822 that is configured to communicate with the merchant device 802 and the primary user device 832 via the network 850. Further, the network interface component 822 may comprise a DSL modem, a PSTN modem, an Ethernet device, a broadband device, a satellite device and/or various other types of wired and/or wireless network communication devices including microwave, RF, and IR communication devices. In various embodiments, the network interface component 822 may also be used for communicating with the blockchain engine 512 and/or the unified datastore 404.

The primary user device 832 may be implemented as a communication device that may utilize appropriate hardware and software configured for wired and/or wireless communication with the merchant device 802 and/or third-party service provider computer 812. The primary user device 832, may be a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. In one embodiment, the primary user device 832 may be user device 102 communicating with another device, a merchant device and/or service provider 812.

The primary user device 832 may include a payment processing application 826 that may be used as a digital wallet that can communicate with a merchant device 202, secondary and/or third party service provider 812 for purchasing, transacting, and communicating. The payment processing application 826, can work jointly with database 830 for retrieving bank account information, user accounts, security codes, tokens that may be associated with various merchant locations. Similarly, the payment processing application, can also provide access to the user profiles for determining which payment method, processing code, to use at a merchant location or in associationg with the unified messaging system 200.

The primary user device 836 may also include other applications 828 to perform various other tasks and/or operations corresponding to the primary user device 224. For example, the other applications 828 may facilitate communication with the merchant device 802, such as to receive an indication, from the merchant device 802, to switch payment processing services from the third-party service provider to the service provider. As another example, the other applications 828 may include security applications, application that enable designation of a primary interactive device, applications that allow for web site searches (including access to merchant websites), and applications that enable user interaction with the unified messaging center. The other applications 828 may also include additional communication applications, such as email, texting, voice, and IM applications that enable communication of emails, calls, texts, and other notifications through the network 850. In various embodiments, the other applications 828 may include location detection applications, such as a mapping, compass, and/or GPS applications, which may be used to determine a location of the user device 102 (primary user device 832). The other applications may 828 social networking applications. Additionally, the other applications 828 may include device interfaces and other display modules that may receive input and/or output information. For example, the other applications 828 may include a GUI configured to provide an interface to one or more users.

The primary user device 224 may further include a database 830, which may be stored in a memory and/or other storage device of the primary user device 824. The database 830 may include, for example, identifiers (IDs) such as operating system registry entries, cookies associated with a web browser and/or the other applications 828, IDs associated with hardware of the network interface component 834, IDs used for payment/user/device authentication or identification, bank information, merchant information, user accounts, and/or other appropriate IDs. In addition, the database 830 may include user identifier information which can be used in conjunction with a secondary user device, merchant, and/or third-party service provider computer 812 during an explicit code exchange and/or contextual information for web browser authentication. Further, the database 830 may include user selected gestures for the authentication, and processing of transactions.

Primary user device 824, can also be equipped with various sensors to provide sensed characteristics about the primary user device 224 and its environment. For example, the sensors can include a camera for taking images of the surroundings used to determine the information to provide a user (e.g., camera used for scanning a QR code or scanning a user eye/pupil or other biometric). As another example, the sensors can include microphones for receiving audio signals which can be used to detect location, and other relevant terms that may be spoken. Further, the sensors can include an accelerometer, a light sensor, a biometric sensor, temperature sensor, etc. For example, the biometric sensor can be used to collect a user fingerprint scan. Each type of sensor providing various characteristics about the device, user, or environment. The sensors may also be used in conjunction with the unified messaging system 200 for authentication and/or communication using voice and/or biometric recognition.

The primary user device 832 may also include at least one network interface component 834 configured to communicate with various other devices such as the merchant device 802, the third-party service provider computer 812, and/or any other secondary user device. In various embodiments, network interface component 834 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth®, Bluetooth low-energy, near field communication (NFC) devices, and/or the like.

Figure 9:
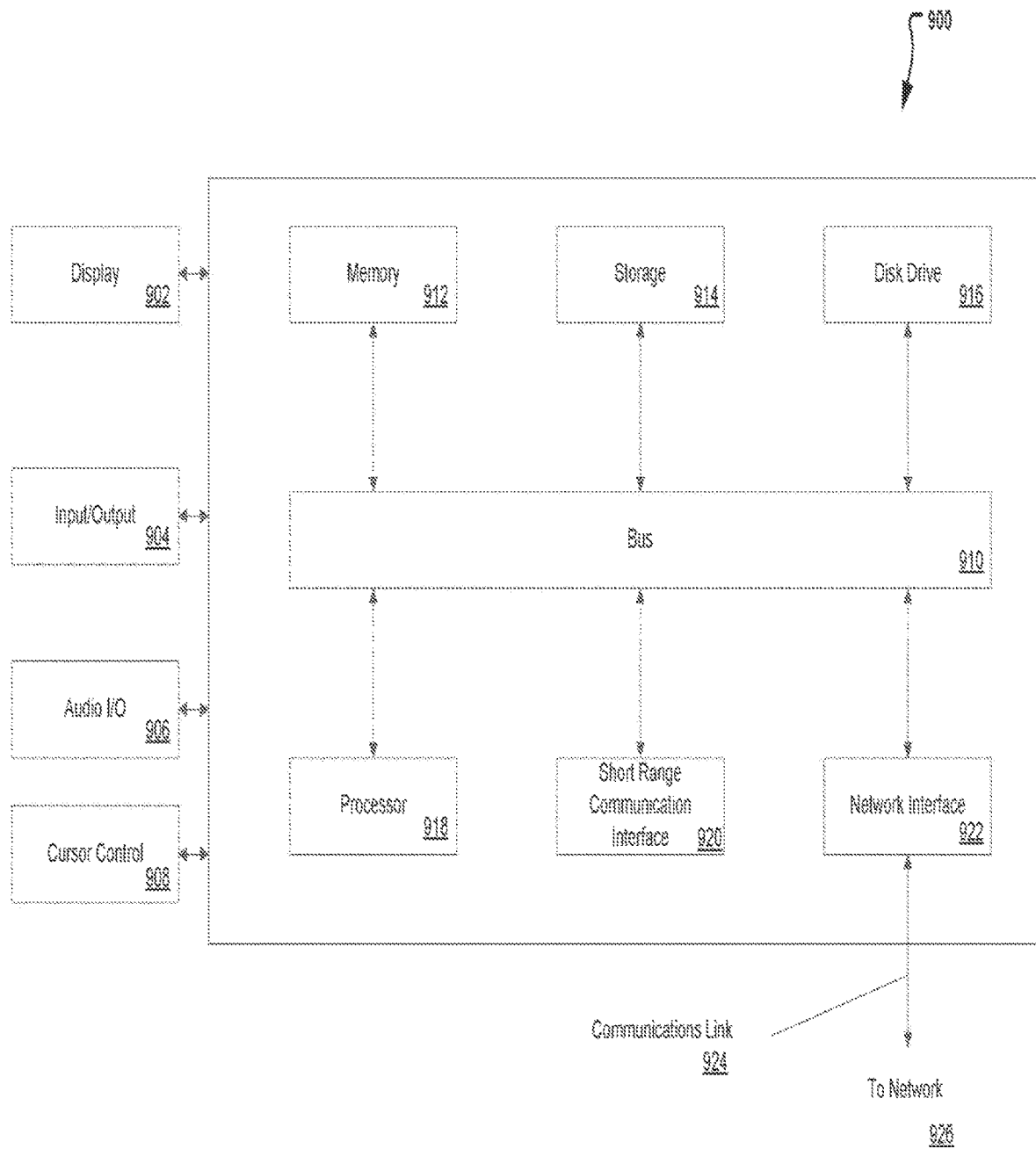
FIG. 9 illustrates an example block diagram of a computer system suitable for implementing one or more devices of the communication systems of FIGS. 1-8.

To FIG. 9 illustrates an example computer system 900 in block diagram format suitable for implementing on one or more devices of the system in FIGS. 1-8 and in particular unified messaging system 200. In various implementations, a device that includes computer system 900 may comprise a personal computing device (e.g., a smart or mobile device, a computing tablet, a personal computer, laptop, wearable device, PDA, etc.) that is capable of communicating with a network 926 (network 850). A third-party service provider and/or a content provider may utilize a network computing device (e.g., a network server) capable of communicating with the network. It should be appreciated that each of the devices utilized by users, service providers, and content providers may be implemented as computer system 900 in a manner as follows. In addition, it should be appreciated that the device may include one used at the merchant as a merchant device 802, third-party service provider computer 812, and/or primary user device 832 (e.g., user device 102).

Additionally, as more and more devices become communication capable, such as new smart devices using wireless communication to report, track, message, relay information and so forth, these devices may be part of computer system 900. For example, windows, walls, and other objects may double as touch screen devices for users to interact with. Such devices may be incorporated with the systems discussed herein.

Computer system 900 may include a bus 910 or other communication mechanisms for communicating information data, signals, and information between various components of computer system 900. Components include an input/output (I/O) component 904 that processes a user action, such as selecting keys from a keypad/keyboard, selecting one or more buttons, links, actuatable elements, etc., and sending a corresponding signal to bus 910. I/O component 904 may also include an output component, such as a display 902 and a cursor control 908 (such as a keyboard, keypad, mouse, touchscreen, etc.). In some examples, I/O component 904 other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 918, which may be a micro-controller, digital signal processor (DSP), or other processing component, that processes these various signals, such as for display on computer system 900 or transmission to other devices over a network 926 via a communication link 924. Again, communication link 924 may be a wireless communication in some embodiments. Processor 918 may also control transmission of information, such as cookies, IP addresses, images, and/or the like to other devices.

Components of computer system 900 also include a system memory component 914 (e.g., RAM), a static storage component 914 (e.g., ROM), and/or a disk drive 916. Computer system 900 performs specific operations by processor 918 and other components by executing one or more sequences of instructions contained in system memory component 912 (e.g., for engagement level determination). Logic may be encoded in a computer readable medium, which may refer to any medium that participates in providing instructions to processor 918 for execution. Such a medium may take many forms, including but not limited to, non-volatile media, volatile media, and/or transmission media. In various implementations, non-volatile media includes optical or magnetic disks, volatile media includes dynamic memory such as system memory component 912, and transmission media includes coaxial cables, copper wire, and fiber optics, including wires that comprise bus 910. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 900 may also include a short range communications interface 920. Short range communications interface 920, in various embodiments, may include transceiver circuitry, an antenna, and/or waveguide. Short range communications interface 920 may use one or more short-range wireless communication technologies, protocols, and/or standards (e.g., WiFi, Bluetooth®, Bluetooth Low Energy (BLE), infrared, NFC, etc.).

Short range communications interface 620, in various embodiments, may be configured to detect other devices (e.g., device 102.) with short range communications technology near computer system 900. Short range communications interface 920 may create a communication area for detecting other devices with short range communication capabilities. When other devices with short range communications capabilities are placed in the communication area of short range communications interface 920, short range communications interface 920 may detect the other devices and exchange data with the other devices. Short range communications interface 920 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 920 may identify a local area network using a short range communications protocol, such as WiFi, and join the local area network. In some examples, computer system 900 may discover and/or communicate with other devices that are a part of the local area network using short range communications interface 920. In some embodiments, short range communications interface 920 may further exchange data and information with the other devices that are communicatively coupled with short range communications interface 920.

In various embodiments of the present disclosure, execution of instruction sequences to practice the present disclosure may be performed by computer system 900. In various other embodiments of the present disclosure, a plurality of computer systems 900 coupled by communication link 924 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 924 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on the user and user device, however, a customer, a merchant, a service or payment provider may otherwise presented with tailored information. Thus, "user" as used herein can also include charities, individuals, and any other entity or person receiving information. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
   determining that a communication request from a user is received by a unified messaging system, the unified messaging system for managing communication between a plurality of response agents and a plurality of users;
   determining an inquiry type out of a plurality of inquiry types for the communication request, the determined inquiry type at least indicating a certain communication platform from which the communication request was received;
   routing, based on the determined inquiry type, the communication request to a certain response agent for handling of the communication request;
   causing a unified agent messaging center interface to be displayed to the certain response agent that includes a plurality of communication platforms available for communicating with the user, the plurality of communication platforms including the certain communication platform used for the communication request;
   generating a cryptographic block that records the communication request to a blockchain, the generated cryptographic block including at least a portion of the communication request; and
   adding the generated cryptographic block to the blockchain, wherein the adding validates the at least a portion of the communication request, and wherein the adding includes:
      storing the cryptographic block using a sidechain of the blockchain for the certain communication platform associated with the determined inquiry type.

2. The method of claim 1, further comprising:
   retrieving user information for the user based on details of the communication request, the details indicating one or more of the user, a user device of the user, or a user account of the user.

3. The method of claim 1, wherein the blockchain is associated with communications using various ones of the plurality of communication platforms for the user.

4. The method of claim 1, wherein the blockchain comprises a plurality of cryptographic blocks, wherein each of the plurality of cryptographic blocks is usable for storing a respective communication exchange between a respective response agent of the plurality of response agents and the user.

5. The method of claim 1, further comprising:
evaluating, for policy a policy violation, a communication exchange between the certain response agent and a user device that corresponds to the communication request; and
responsive to the evaluating of the communication exchange indicating the violation, removing the cryptographic block.

6. The method of claim 1, wherein the communication request is received at a midtier zone and the midtier zone routes the communication request to one of a common infrastructure or a corporate infrastructure based in part on content of the communication request.

7. The method of claim 1, wherein said routing is further based on determined content of the communication request and a previous communication between the user initiating the communication request and one of the agents of the plurality of response agents.

8. The method of claim 1, wherein the blockchain includes a plurality of sidechains including the sidechain, and wherein each subchain in the plurality of subchains is usable for each of a plurality of platforms used for communicating with the unified messaging system.

9. The method of claim 1, wherein the certain communication platform includes one of an email platform, a messaging platform, a chat platform, or a social media platform.

10. A computing device of a unified messaging system, the device comprising:
a non-transitory memory storing instructions; and
a processor configured to execute the instructions to cause the computing device to:
receive a communication request from a user via a certain communication platform, the unified messaging system usable for managing communications between a plurality of response agents and a plurality of users including the user;
determine an inquiry type out of a plurality of inquiry types for the communication request, the determined inquiry type at least indicating the certain communication platform;
route, based on the determined inquiry type, the communication request to a certain response agent for handling of the communication request;
indicate, to the certain response agent via a user interface, a plurality of communication platforms available for communicating with the user, the plurality of communication platforms including the certain communication platform used for the communication request; and
update an existing sidechain of a blockchain associated with the user with a new cryptographic block to document the communication request, wherein updating the existing sidechain comprises:
adding, using the new cryptographic block, at least a portion of the communication request at the existing sidechain, wherein adding includes validating the at least the portion of the communication request on the blockchain; and
storing the cryptographic block using the existing sidechain of the blockchain for the certain communication platform associated with the determined inquiry type.

11. The computing device of claim 10, wherein the blockchain comprises a plurality of cryptographic blocks, wherein each of the plurality of cryptographic blocks is usable for storing a respective communication exchange between a respective response agent of the plurality of response agents and the user.

12. The computing device of claim 10, wherein the blockchain is associated with communications using various ones of the plurality of communication platforms for the user.

13. The computing device of claim 10, wherein executing the instructions further causes the computing device to:
retrieve user information for the user based on details of the communication request, the details indicating one or more of the user, a user device of the user, or a user account of the user.

14. The computing device of claim 10, wherein said routing is further based on determined content of the communication request and a previous communication between the user initiating the communication request and one of the agents of the plurality of response agents.

15. The computing device of claim 10, wherein the certain communication platform includes one of an email platform, a messaging platform, a chat platform, or a social media platform.

16. A non-transitory machine-readable medium having instructions stored thereon, the instructions executable to cause performance of operations comprising:
receiving a communication request, from a user via a certain communication platform at a unified messaging system usable for managing communications between a plurality of response agents and a plurality of users including the user;
determining an inquiry type out of a plurality of inquiry types for the communication request, the determined inquiry type at least indicating the certain communication platform;
routing, based on the determined inquiry type, the communication request to a certain response agent for handling of the communication request;
identifying a plurality of communication platforms available for communicating with the user to the certain response agent on a user device of the certain response agent, the plurality of communication platforms including the certain communication platform used for the communication request; and
updating an existing sidechain of a blockchain associated with the user with a new cryptographic block to document the communication request, wherein the updating the existing sidechain comprises:
adding, using the new cryptographic block, at least a portion of the communication request at the existing sidechain, wherein the adding includes validating the at least the portion of the communication request on the blockchain; and
storing the cryptographic block using the existing sidechain of the blockchain for the certain communication platform associated with the determined inquiry type.

17. The non-transitory machine-readable medium of claim 16, wherein the blockchain comprises a plurality of cryptographic blocks, wherein each of the plurality of cryptographic blocks is usable for storing a respective communication exchange between a respective response agent of the plurality of response agents and the user.

18. The non-transitory machine-readable medium of claim 16, wherein the blockchain is associated with communications using various ones of the plurality of communication platforms for the user.

19. The non-transitory machine-readable medium of claim 16, wherein the operations further comprise:
    retrieving user information for the user based on details of the communication request, the details indicating one or more of the user, a user device of the user, or a user account of the user.

20. The non-transitory machine-readable medium of claim 16, wherein said routing is further based on determined content of the communication request and a previous communication between the user initiating the communication request and one of the agents of the plurality of response agents.

* * * * *